United States Patent
Watts

(10) Patent No.: US 8,789,379 B2
(45) Date of Patent: Jul. 29, 2014

(54) TWO-PHASE HYDROGEN PUMP AND METHOD

(75) Inventor: Daniel A. Watts, Surfside, CA (US)

(73) Assignee: The Boeing Company, Chicago, IL (US)

( * ) Notice: Subject to any disclaimer, the term of this patent is extended or adjusted under 35 U.S.C. 154(b) by 1515 days.

(21) Appl. No.: 12/464,347

(22) Filed: May 12, 2009

(65) Prior Publication Data
US 2010/0287955 A1 Nov. 18, 2010

(51) Int. Cl.
F17C 9/02 (2006.01)
F17C 13/00 (2006.01)
F02M 37/00 (2006.01)
F02M 25/12 (2006.01)

(52) U.S. Cl.
CPC ........... *F02M 25/12* (2013.01); *F02M 37/0064* (2013.01); *Y02E 60/324* (2013.01); *Y02E 60/321* (2013.01); *Y02T 10/121* (2013.01)
USPC ............................................. 62/50.2; 62/50.6

(58) Field of Classification Search
CPC ....................................................... F02C 6/16
USPC ............. 62/45.1, 47.1, 50.1, 50.2, 50.4, 50.5, 62/50.6, 50.7, 87, 402; 417/207–209
See application file for complete search history.

(56) References Cited

U.S. PATENT DOCUMENTS 1,861,075 A * 5/1932 Allyne et al. ................... 62/481
4,246,890 A * 1/1981 Kraus et al. .................... 126/636
4,932,214 A * 6/1990 Nieratscher et al. ........... 62/50.6
5,513,961 A * 5/1996 Engdahl et al. ................ 417/313
5,590,535 A * 1/1997 Rhoades ......................... 62/50.2
5,787,940 A 8/1998 Bonn et al.
6,374,618 B1 4/2002 Lak
2005/0178557 A1* 8/2005 Johansen et al. .............. 166/368
2007/0000259 A1 1/2007 Brook et al.
2008/0006743 A1 1/2008 Miller

FOREIGN PATENT DOCUMENTS

CA 2362881 2/2002
EP 0318904 6/1989

OTHER PUBLICATIONS

Written Opinion of the International Searching Authority for PCT/US2010/30603, mailed Jul. 22, 2010.
Analytical Chemistry, "Pump Based on Thermal Expansion of a Liquid for Delivery of a Pulse-Free Flow Particularly for Capillary Chromatography and Other Microvolume Application," Anal. Chem., 1998, 70 (2), pp. 366-372• DOI: 10.1021/ac970685u • Publication Date (Web): Jan. 15, 1998, available at <http://pubs.acs.org/doi/abs/10.1021/ac970685u> last visited May 7, 2009.

* cited by examiner

Primary Examiner — John F Pettitt
Assistant Examiner — Ignacio E Landeros

(57) ABSTRACT

A hydrogen pump comprises a pump housing and a heating mechanism. The pump housing receives liquid hydrogen through a housing inlet. The heating mechanism vaporizes the liquid hydrogen into gaseous hydrogen. The pump housing releases the gaseous hydrogen through a housing outlet at a predetermined pressure level of the gaseous hydrogen. The pump housing closes the housing outlet such as when the liquid hydrogen in the pump housing falls below a depletion level. The pump housing opens and additional liquid hydrogen enters the pump housing through the housing inlet.

19 Claims, 9 Drawing Sheets

TWO-PHASE HYDROGEN PUMP AND METHOD

CROSS-REFERENCE TO RELATED APPLICATIONS (Not Applicable)

STATEMENT RE: FEDERALLY SPONSORED RESEARCH/DEVELOPMENT (Not Applicable)

FIELD

The present invention relates generally to fuel systems and, more particularly, to a system and method for converting liquid hydrogen into gaseous hydrogen.

BACKGROUND

Hydrogen offers several advantages over petroleum based fuels in terms of reduced emissions and improved fuel efficiency. For example, when hydrogen is used in fuel cells to produce electricity for powering electric motors, the byproduct is water. When hydrogen is burned in an internal combustion engine such as a turbine engine or a piston engine, exhaust gas emissions are relatively low as compared to the emissions resulting from the combustion of petroleum based fuels. Another advantage of hydrogen as a fuel is the generally higher energy-per-mass density as compared to petroleum based fuels such as jet fuel. For example, hydrogen contains approximately three times the energy-per-unit mass of petroleum based fuels.

Hydrogen may be efficiently stored in liquid form in order to minimize the required storage volume. Although storing hydrogen in liquid form requires maintaining the temperature below approximately −420° F., the low pressure at which liquid hydrogen may be stored minimizes the overall weight of the vehicle as compared to the large number of tanks that would be required to store hydrogen in gaseous form.

The above-noted advantages associated with hydrogen may be applied to certain vehicles. For example, high-altitude, long-endurance (HALE) aircraft may benefit from a hydrogen-based propulsion system. HALE aircraft may be designed to operate at altitudes of up to 65,000 feet and may stay aloft for up to fourteen days or longer. However, a variety of other vehicles and systems may benefit from hydrogen as an alternative to petroleum based fuels.

In order to use hydrogen in a fuel cell or in an internal combustion engine, the hydrogen must be in a gaseous state. In addition, it is necessary to increase the pressure of the gaseous hydrogen to suit the operating requirements of the fuel cell or internal combustion engine. Prior art methods for converting liquid hydrogen to gaseous hydrogen at a suitable temperature and pressure include the use of heat exchangers and mechanical pumps. Heat exchangers may be used to vaporize the liquid hydrogen into gaseous hydrogen for use as a fuel. Unfortunately, heat exchangers are typically bulky.

In long endurance applications such as HALE aircraft, mechanical pumps must be capable of operating continuously for extended periods of time. The extremely low temperature of liquid hydrogen and the low viscosity of hydrogen limits the efficiency and reliability of mechanical pumps. More specifically, because of the extremely low temperatures, portions of the mechanical pump that are exposed to the liquid hydrogen may undergo significant thermal contraction. In order to accommodate differences in thermal contraction between various portions of the mechanical pump, the mating components of the pump must be designed and manufactured with relatively large tolerances. However, large tolerances may reduce pump efficiency.

In addition, mechanical pumps typically include rotating components which require lubrication to minimize friction and prevent wear. Unfortunately, the relatively low viscosity of liquid hydrogen minimizes the ability of the hydrogen to act as a lubricant. Furthermore, the low temperature of liquid hydrogen minimizes the available number of compatible lubricants (e.g., Teflon) that may be used in the pump.

As can be seen, there exists a need in the art for a system and method for converting liquid hydrogen into gaseous hydrogen at a suitable operating temperature and pressure. In this regard, there exists a need in the art for a system and method for converting liquid hydrogen into gaseous hydrogen which requires a minimum number of moving parts and wherein gaseous hydrogen may be continuously produced in a reliable and efficient manner.

BRIEF SUMMARY

The above described needs associated with hydrogen fuel are specifically addressed by the present disclosure which provides, in an embodiment, a hydrogen pump comprising a pump housing and a heating mechanism. The pump housing is configured to receive liquid hydrogen through a housing inlet such as from a supply tank. The heating mechanism is configured to vaporize the liquid hydrogen contained within the pump housing to generate gaseous hydrogen.

Furthermore, the heating mechanism is configured to increase the pressure of the gaseous hydrogen such that the gaseous hydrogen may be continuously released from a housing outlet upon attainment of a predetermined pressure of the gaseous hydrogen. The gaseous hydrogen may be continuously released from the housing outlet until the liquid hydrogen in the pump housing falls below a predetermined level at which time the housing outlet may close. Residual gaseous hydrogen may then be vented from the pump housing to facilitate the receiving of additional liquid hydrogen within the pump housing at the start of a new cycle.

In an embodiment, the hydrogen pump may be configured such that the housing inlet opens momentarily (i.e., for a predetermined period of time) after the closing of the housing outlet and prior to venting of the residual gaseous hydrogen. In this manner, the higher pressure gaseous hydrogen within the pump housing flows out of the pump housing through the housing inlet and mixes with liquid hydrogen to reduce the temperature of the gaseous hydrogen.

The hydrogen pump may include an intermediate section interconnecting the pump housing to the supply tank. The intermediate section may contain liquid hydrogen and may provide a location for the mixing of the gaseous hydrogen with the liquid hydrogen. Following the mixing of the gaseous hydrogen with the liquid hydrogen, residual gaseous hydrogen in the pump housing may be vented through a vent line in order to reduce the pressure within the pump housing. The venting of the residual gaseous hydrogen allows the additional liquid hydrogen to flow into the housing inlet at the start of a new cycle. The vent line may optionally be routed through the intermediate section in order to extract the heat of the residual gaseous hydrogen in the vent line prior to delivery of the residual gaseous hydrogen to the supply tank. Extracting the heat from the residual gaseous hydrogen reduces the amount of heat required to vaporize the liquid hydrogen in the pump housing.

The technical benefits of the present disclosure include the combining of vaporization and pumping of hydrogen into a single, passive, closed system without the need for a mechanical pump or a conventional heat exchanger. The passive hydrogen pump provides a means for generating gaseous hydrogen at a desired operating temperature and pressure in an efficient and reliable manner.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become apparent upon reference to the drawings wherein like numbers refer to like parts throughout and wherein.

DETAILED DESCRIPTION

Figure 1:
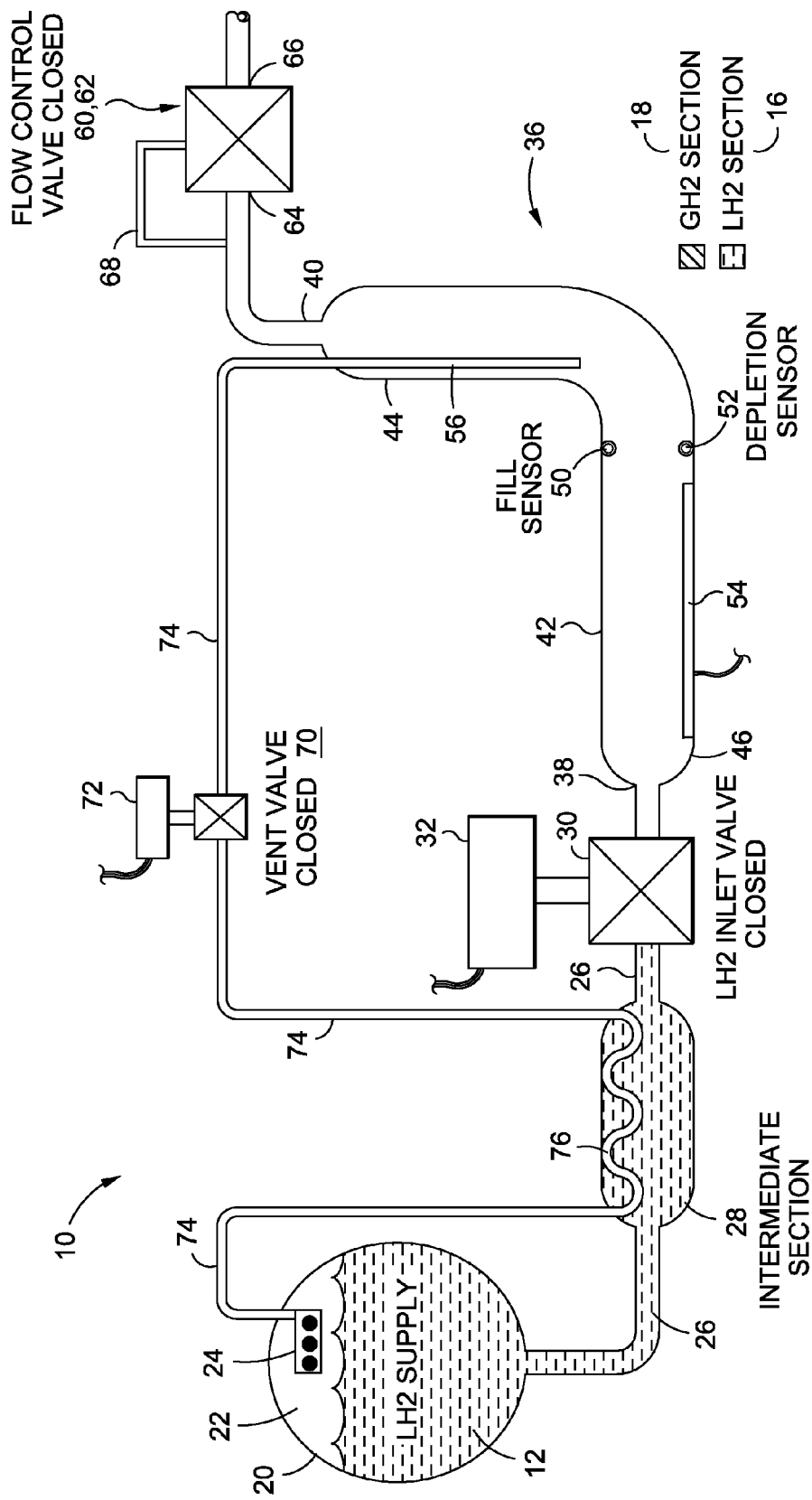
FIG. 1 is a schematic illustration of a two-phase hydrogen pump at the start of a cycle and illustrating a supply tank and an intermediate section fluidly coupled to a pump housing by an inlet valve.

Referring now to the drawings wherein the showings are for purposes of illustrating preferred and various embodiments of the disclosure only and not for purposes of limiting the same, shown in FIG. 1 is a schematic illustration of a hydrogen pump 10 as may be used for converting liquid hydrogen 12 into gaseous hydrogen 14. As was indicated above, gaseous hydrogen 14 may be used as a fuel such as for an internal combustion engine, a fuel cell or for a variety of other applications, without limitation, as noted below.

In a broad sense, the hydrogen pump 10 comprises a pump housing 36 and a heating mechanism 54. The pump housing 36 may be configured for receiving liquid hydrogen 12 through a housing inlet 38. More specifically, the liquid hydrogen 12 may be stored in a supply tank 20 such as a cryogenic supply tank 20 suitable for maintaining the hydrogen at a temperature below approximately −420° F. In this regard, the supply tank 20 may be configured as a cryogenic supply tank 20 employing active and/or passive insulation in order to maintain the hydrogen in a liquid state. However, the supply tank 20 may employ any technique known in the art for maintaining hydrogen in a liquid state. Although shown as a generally spherically shaped container, the supply tank 20 may be provided in any suitable size, shape and configuration, without limitation.

Upon receiving the liquid hydrogen 12 into the pump housing 36, a heating mechanism 54 may be configured to vaporize the liquid hydrogen 12 in the pump housing 36 into gaseous hydrogen 14. In addition, the heating mechanism 54 may be configured to increase the pressure of the gaseous hydrogen 14 in the pump housing 36 to a level that is suitable for use by a component that is downstream of the hydrogen pump 10. For example, for an internal combustion engine, the hydrogen pump 10 may be configured to produce gaseous hydrogen 14 within a temperature range of approximately −10 F.° to 250° F. and within a pressure range of approximately 60 to 100 psia. However, the hydrogen pump 10 may be configured to provide the gaseous hydrogen 14 in any temperature and pressure for use in a wide variety of applications.

Referring still to FIG. 1, shown is the supply tank 20 fluidly coupled to the pump housing 36 by a supply line 26. The pump housing 36 may include a housing inlet 38 to which an inlet valve 30 may be fluidly coupled. The inlet valve 30 may be operative to open and close to allow entry of liquid hydrogen 12 into the pump housing 36 and/or to allow gaseous hydrogen 14 to flow out of the pump housing 36 such that the gaseous hydrogen 14 may mix with the liquid hydrogen 12 in a manner as will be described in greater detail below.

Figure 4:
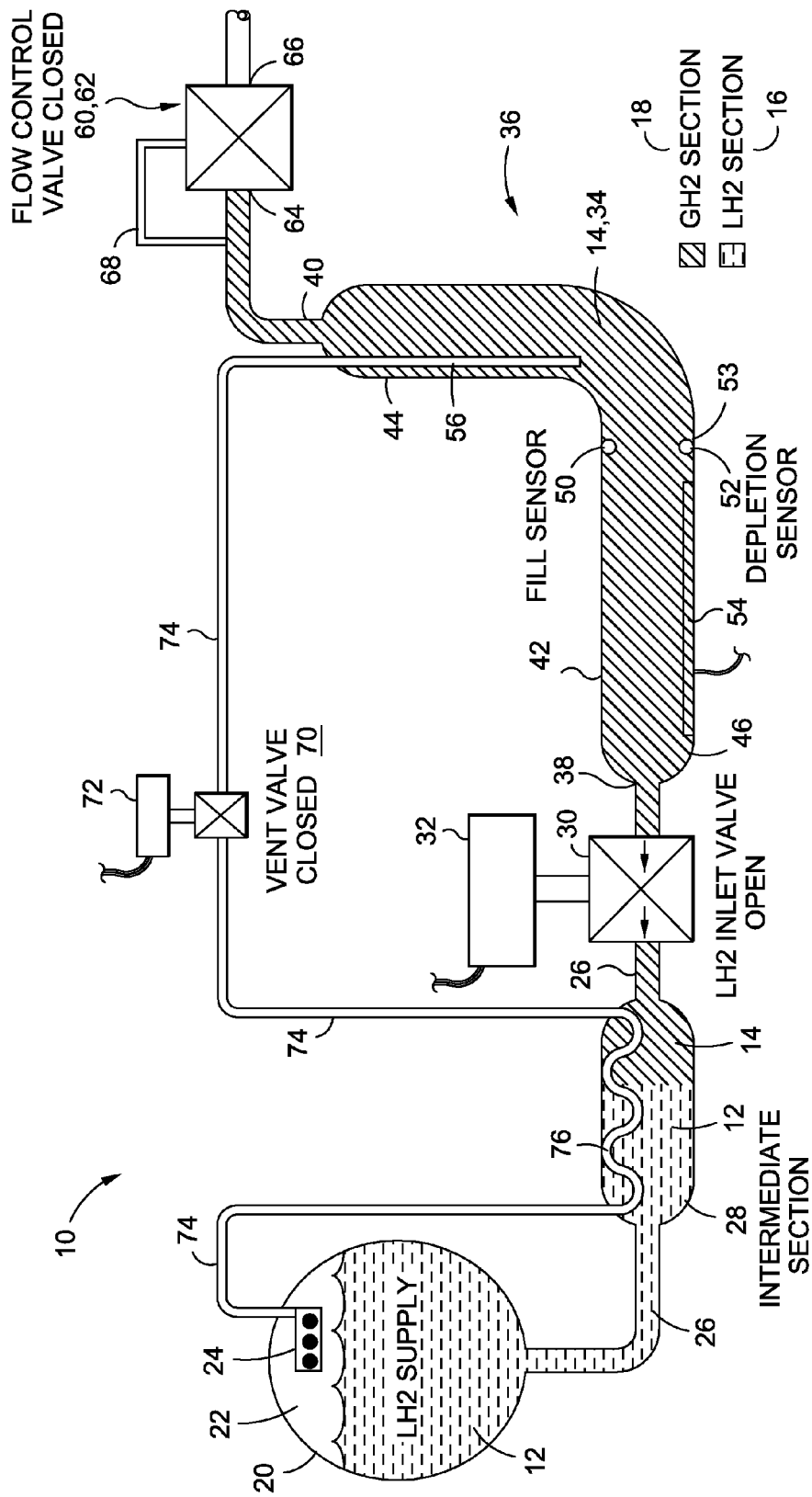
FIG. 4 is a schematic illustration of the hydrogen pump wherein the pump housing is depleted of liquid hydrogen and the inlet valve is open to allow gaseous hydrogen to mix with the liquid hydrogen in the intermediate section.

Referring briefly to FIG. 4, the hydrogen pump 10 may further include an intermediate section 28 interposed in the supply line 26 between the inlet valve 30 and the supply tank 20. As will be described in greater detail below, the intermediate section 28 may provide a location wherein gaseous hydrogen 14 from the pump housing 36 may mix with liquid hydrogen 12 in order to reduce the temperature of the gaseous hydrogen 14. In addition, the intermediate section 28 may provide a location through which a vent line 74 containing residual gaseous hydrogen 34 may be routed to facilitate extraction of heat from the residual gaseous hydrogen 34 prior to delivery of the residual gaseous hydrogen 34 to the supply tank 20 as will also be described below.

Advantageously, the hydrogen pump 10 as disclosed herein provides a passive, closed system which combines the requirement of vaporizing liquid hydrogen 12 and continuous pumping of the hydrogen such that gaseous hydrogen 14 may be continuously delivered for downstream use such as in an internal combustion engine, a fuel cell or any other system, environment, application, assembly, structure or vehicle, without limitation. For example, the hydrogen pump 10 may be incorporated into a variety of applications and industries including, but not limited to, refinery operations, food processing, power plant cooling and in nuclear reactor facilities. In addition, the hydrogen pump 10 may be incorporated into a wide variety of manufacturing operations and other processes including, without limitation, heat treating, welding and chemical synthesis.

Referring still to FIG. 1, the pump housing 36, in an embodiment, may comprise a horizontal section 42 that may be contiguous with a vertical section 44. The horizontal section 42 may be configured for containing or housing the liquid hydrogen 12 which may be received from the supply tank 20 and such that the liquid hydrogen 12 may settle in the horizontal section The vertical section 44 may extend upwardly from the horizontal section 42. As shown in FIG. 1, the vertical section 44 may be located at one of opposing ends of the horizontal section 42 although the vertical section 44 may be positioned at any location relative to the horizontal section 42. In addition, the vertical section 44 may be configured in any size or shape and is not limited to that which is shown in the figures. The vertical section 44 may provide a location where the gaseous hydrogen 14 may accumulate inside the pump housing 36.

Figure 5:
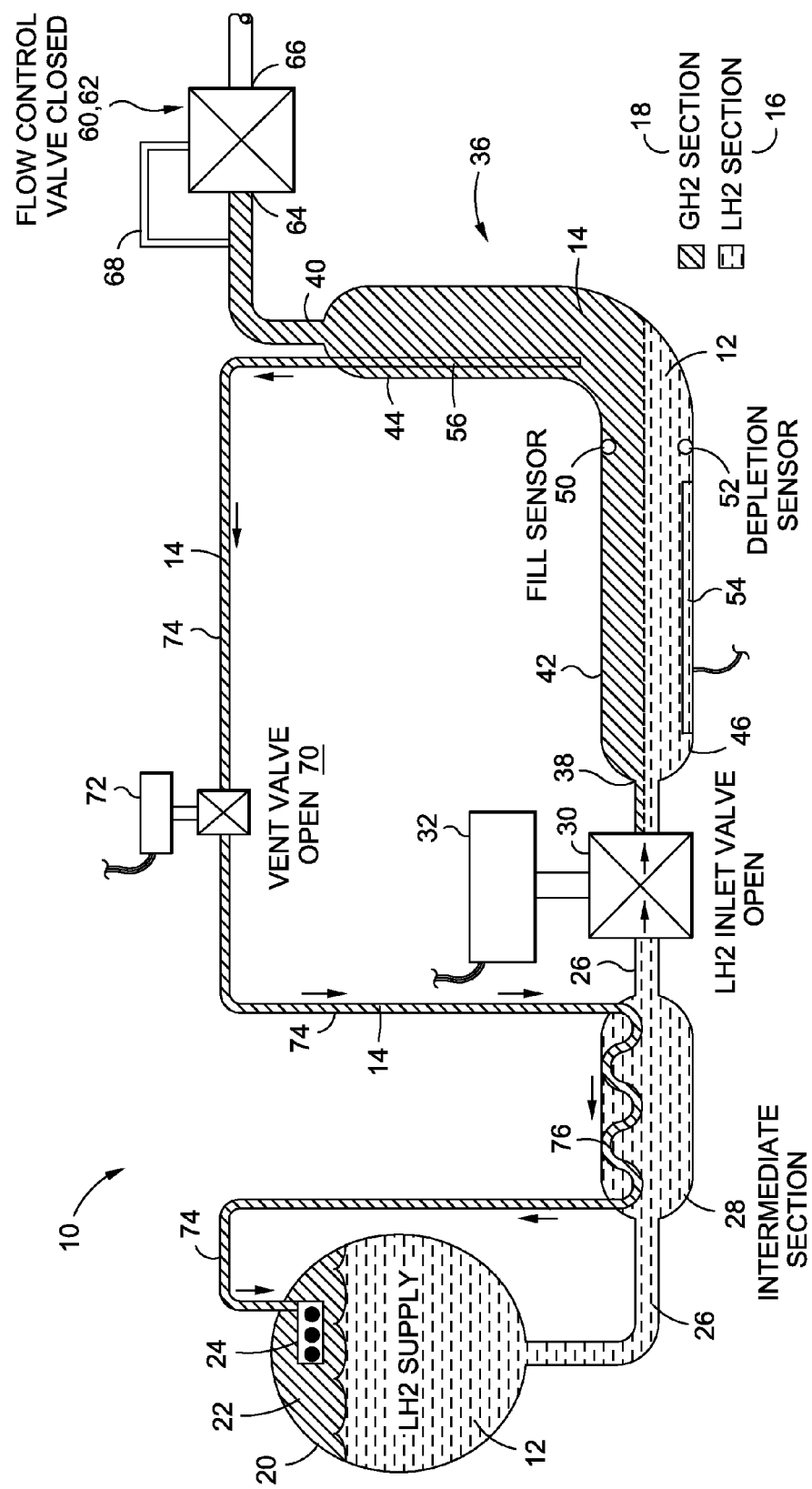
FIG. 5 is a schematic illustration of the hydrogen pump wherein a vent valve is open allowing the venting of residual gaseous hydrogen from the pump housing in order to reduce the pressure therewithin such that liquid hydrogen may flow into the pump housing.

Although shown in an L-shaped configuration, the pump housing 36 may be provided in any size, shape and configuration which facilitates receiving of the liquid hydrogen 12 and heating thereof. Furthermore, the pump housing 36 may be provided in any configuration which facilitates the vaporization and accumulation of gaseous hydrogen 14 for discharge from the pump housing 36. In this regard, the pump housing 36 may be configured to release the gaseous hydrogen 14 through the housing outlet 40 when the gaseous hydrogen 14 within the pump housing 36 reaches a predetermined pressure. The housing outlet 40 of the pump housing 36 may be configured to close when the liquid hydrogen 12 falls below a predetermined level. In addition, as shown in FIG. 4, the pump housing 36 may be operative to vent residual gaseous hydrogen 34 remaining in the pump housing 36 after the housing outlet 40 closes in order to reduce a pressure within the pump housing 36. In this manner, additional liquid hydrogen 12 may enter the pump housing 36 through the housing inlet 38 as shown in FIG. 5 and as will be described in greater detail below.

The hydrogen pump 10 may include a flow control valve 60 which may be fluidly coupled to or integrated into the housing outlet 40. The flow control valve 60 may include a flow control valve inlet 64 and a flow control valve outlet 66. The flow control valve inlet 64 may be fluidly coupled to the housing outlet 40. The flow control valve outlet 66 may be fluidly coupled to a downstream component via a delivery conduit (not shown) such that the downstream component may receive gaseous hydrogen 14 from the hydrogen pump 10. The flow control valve 60 may be provided in any suitable configuration such as a check valve, a pressure regulator 58 or any other suitable valve arrangement or mechanism which regulates the opening and closing of the housing outlet 40. The flow control valve 60 may include a control valve actuator 62 which may be configured to open the flow control valve 60 to allow for release of the gaseous hydrogen 14 from the pump housing 36 upon attainment of a predetermined pressure of the gaseous hydrogen 14 within the pump housing 36. Furthermore, the flow control valve 60 may be configured to close when the pressure of the gaseous hydrogen 14 falls below a predetermined pressure and/or when the level of the liquid hydrogen 12 in the pump housing 36 falls below a predetermined level such as below a depletion level 53 as illustrated in FIG. 4.

In an embodiment, the flow control valve 60 may be regulated in correspondence to a sensed level of the liquid hydrogen 12 within the pump housing 36. For example, the flow control valve 60 or control valve actuator 62 may be communicatively coupled to one or more level sensors which may be mounted within or incorporated into the pump housing 36 such as in the horizontal section 42 as shown in FIG. 1. In this regard, the pump housing 36 may include one or more fill sensors 50 and/or one or more depletion sensors 52. The fill sensor 50 and depletion sensor 52 may be communicatively coupled to the flow control valve 60, inlet valve 30 and/or a vent valve 70 as illustrated in FIG. 1. The fill sensor 50 and depletion sensor 52 may be provided as any suitable mechanism configured to sense the level of the liquid hydrogen 12. For example, the fill sensor 50 and/or depletion sensor 52 may be provided as an optical sensor, an ultrasonic sensor, or any other suitable level sensing device.

In an embodiment, the fill sensor 50 may sense when the liquid hydrogen 12 reaches a fill level 51 within the horizontal section 42 of the pump housing 36. The fill sensor 50 may generate signals representative of the attainment of the fill level 51. Such signals may be provided to the flow control valve 60, the inlet valve 30, the vent valve 70 and/or to any other operating mechanism of the hydrogen pump 10. The depletion sensor 52 may be operative to sense and/or indicate when the liquid hydrogen 12 falls below a depletion level 53 which may indicate that the pump housing 36 is empty.

The hydrogen pump 10 may include a sense line 68 which may extend between the flow control valve 60 and the pump housing 36. The sense line 68 may be configured to provide signals representative of a back pressure of the gaseous hydrogen 14 at the housing outlet 40. The back pressure may be sensed by any suitable sensing mechanism such as by one or more pressure transducers (not shown). The buildup of gaseous hydrogen 14 within the pump housing 36 and, more particularly, within the vertical section 44 of the pump housing 36 may be sensed and communicated to the flow control valve 60 via the sense line 68 such that the flow control valve 60 may be regulated accordingly. For example, the flow control valve 60 may open to release the gaseous hydrogen 14 upon attainment of a predetermined pressure within the pump housing 36.

In an embodiment, the flow control valve 60 may be located or positioned at a higher elevation than the pump housing 36 and/or at a higher elevation than the housing outlet 40 to facilitate release of the gaseous hydrogen 14. However, the flow control valve 60 may be located at any elevation relative to the pump housing 36. Likewise, the supply tank 20 may also be positioned at a higher elevation than the housing inlet 38 in order to facilitate gravity feed of the liquid hydrogen 12 to the pump housing 36. However, the schematic illustrations of FIGS. 1-6 represent an arrangement of the hydrogen pump 10 and are not to be construed as limiting alternative arrangements regarding the relative positions of the supply tank 20, pump housing 36, flow control valve 60 and other components included in the hydrogen pump 10. For example, the supply tank 20 may be located at the same elevation as the pump housing 36. Alternatively, the supply tank 20 may be located at a lower elevation than the pump housing 36. The hydrogen pump 10 may optionally include an auxiliary pump for urging the liquid hydrogen 12 into the pump housing 36. For example, the hydrogen pump 10 may include a boost pump 46 which may be fluidly coupled to the pump housing 36 at the housing inlet 38 for increasing the flow rate of the liquid hydrogen 12 into the pump housing 36.

Referring still to FIG. 1, the hydrogen pump 10 may include the heating mechanism 54 which may be configured to vaporize liquid hydrogen 12 in the pump housing 36 to generate the gaseous hydrogen 14. The heating mechanism 54 may also be configured to increase the pressure of the gaseous hydrogen 14 within the pump housing 36 by continuously applying heat to the liquid hydrogen 12 and/or to the gaseous hydrogen 14. In an embodiment, the heating mechanism 54 may comprise an externally-mounted heating element disposed around or covering at least an external portion of the horizontal section 42 of the pump housing 36. Alternatively or in addition to an externally-mounted arrangement, the heating mechanism 54 may comprise one or more heating elements extending into an interior of the pump housing 36 such as into the horizontal section 42 and/or vertical section 44 at one or more locations.

Regardless of the specific configuration, the heating mechanism 54 may be configured to increase the temperature of the liquid hydrogen 12. For example, the heating mechanism 54 may be configured to cause gradual vaporization of the liquid hydrogen 12 into gaseous hydrogen 14 or to continuously vaporize the liquid hydrogen 12 into gaseous hydrogen 14. In an embodiment, the heating mechanism 54 may be configured to intermittently or periodically heat the liquid hydrogen 12 to a temperature that causes vaporization. In addition, the heating mechanism 54 may be configured to increase the temperature and/or pressure of the gaseous hydrogen 14 to a level that corresponds to the operating requirements of the downstream component to which the gaseous hydrogen 14 is delivered such as an internal combustion engine.

The hydrogen pump 10 may further include a vent line 74 which may extend from the pump housing 36 to allow venting of gaseous hydrogen 14. In an embodiment shown in FIG. 1, the vent line 74 may extend between the pump housing 36 and the supply tank 20 for venting residual gaseous hydrogen 34 to the supply tank 20 as shown in FIG. 4. For example, at a predetermined time during operation of the hydrogen pump 10 such as upon depletion of the liquid hydrogen 12 within the pump housing 36, it may be desirable to reduce a pressure within the pump housing 36 to allow additional liquid hydrogen 12 to flow into the pump housing 36 at the start of another cycle. In order to regulate the venting of the pump housing 36, the vent line 74 may include a vent valve 70 coupled to a vent valve actuator 72. The vent valve actuator 72 may be communicatively coupled to the fill sensor 50 and/or depletion sensor 52 or to other sensing and control components of the hydrogen pump 10 such as, without limitation, the inlet valve 30 and flow control valve 60.

Figure 3:
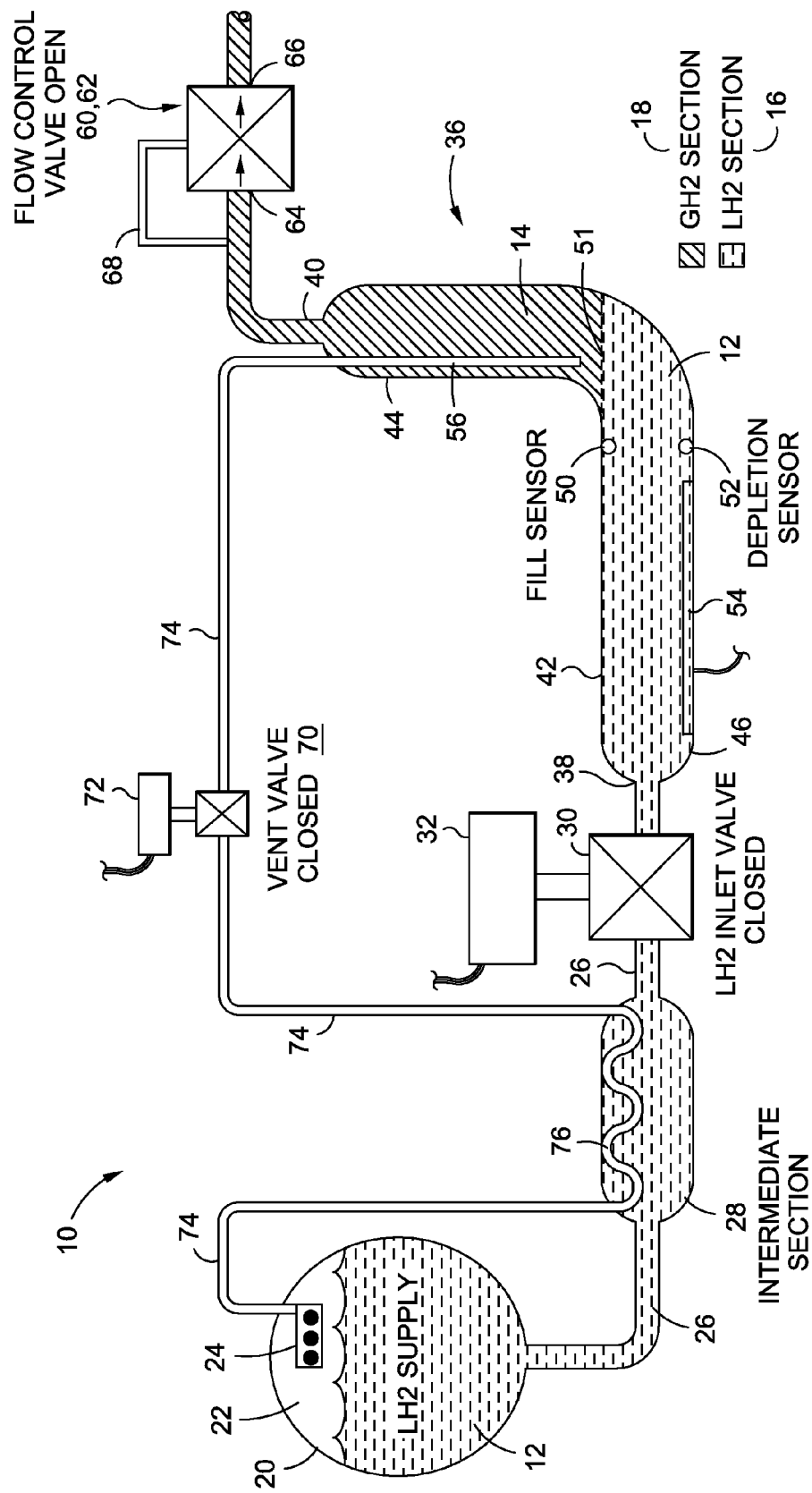
FIG. 3 is a schematic illustration of the hydrogen pump wherein the pump housing is filled with liquid hydrogen and a heating element vaporizes the liquid hydrogen into gaseous hydrogen for release at a flow control valve.

The vent valve 70 may be operative to open in response to receiving a signal indicating that the liquid hydrogen 12 within the pump housing 36 is at or below the depletion level 53. The open vent valve 70 allows the residual gaseous hydrogen 34 to be vented from the pump housing 36 such as to the supply tank 20 as shown in FIG. 4. Simultaneous with the opening of the vent valve 70, the inlet valve 30 may be opened to facilitate entry of additional liquid hydrogen 12 into the pump housing 36. The vent valve 70 may remain open until the liquid hydrogen 12 reaches a predetermined level such as the fill level 51 within the pump housing 36 as illustrated in FIG. 3. Upon reaching the fill level 51 as sensed by the fill sensor 50, the vent valve 70, inlet valve 30 and flow control valve 60 may be closed in order to seal the pump housing 36 to allow for vaporization of liquid hydrogen 12 and the generation of gaseous hydrogen 14. Optionally, the inlet valve 30 may be opened for a predetermined period of time prior to opening of the inlet valve 30 to allow the gaseous hydrogen 14 to flow out of the pump housing 36 wherein the gaseous hydrogen 14 may mix with the liquid hydrogen 12 in the intermediate section 28 or in the supply line 26. The mixing of the gaseous hydrogen 14 with the liquid hydrogen 12 may reduce the temperature of the gaseous hydrogen 14.

Referring to FIG. 4, the hydrogen pump 10 may include a heat extraction mechanism 76 configured to extract heat from the residual gaseous hydrogen 34 that is vented from the pump housing 36. Extracting heat from the residual gaseous hydrogen 34 reduces the amount of heat required to vaporize the liquid hydrogen 12 in the pump housing 36. In an embodiment, the heat extraction mechanism 76 may comprise a portion of the vent line 74 being extended through the intermediate section 28 which may be filled with liquid hydrogen 12. The portion of the vent line 74 in the intermediate section 28 may be formed or shaped in a tortuous path in order to maximize the amount of surface area of the vent line 74 that is exposed to the liquid hydrogen 12. However, the heat extraction mechanism 76 is not limited to routing the vent line 74 through the intermediate section 28 but may comprise a variety of alternative configurations for extracting heat from the residual gaseous hydrogen 34 in the vent line 74.

Referring to FIG. 1, in an embodiment, the hydrogen pump 10 may further include a coalescing filter 56 to prevent the formation of liquid hydrogen 12 droplets in the interior of the vent line 74. Such droplets may be entrained with the gaseous hydrogen 14 within the pump housing 36. If left unfiltered, the liquid hydrogen 12 droplets may become trapped within the vent line 74 which may result in clogging thereof. The coalescing filter 56 may be mounted on an inlet of the vent line 74 which may extend into the pump housing 36 as shown in FIGS. 1-6. The coalescing filter 56 may be provided in any suitable configuration which prevents the entry or formation of liquid hydrogen 12 droplets into the vent line 74. For example, the coalescing filter 56 may comprise an arrangement that forces the residual gas into a tortuous path having multiple turns to separate liquid droplets from the gaseous hydrogen 14 prior to entry into the vent line 46.

In an embodiment of the hydrogen pump 10, the vent line 74 may terminate at the supply tank 20 which may include a diffuser 24 to slow the rate at which the gaseous hydrogen 14 is discharged from the vent line 74. In this regard, the diffuser 24 may prevent or minimize the disturbance of the surface of the liquid hydrogen 12 which may cause splashing within the supply tank 20 and which may cause a pressure drop within the ullage 22 of the supply tank 20 and/or clogging of the diffuser 24. The diffuser 24 may prevent such splashing by preventing direct discharge onto the surface of the liquid hydrogen 12 in the supply tank 20.

The operation of the hydrogen pump 10 will now be described with reference to the flow chart of FIG. 7 and the schematic illustrations of FIGS. 1-6. FIG. 7 illustrates a methodology of vaporizing the liquid hydrogen 12 to form the gaseous hydrogen 14. In the schematic illustrations, the liquid hydrogen 12 is indicated as occupying a liquid section 16 of the hydrogen pump 10. The gaseous hydrogen 14 is indicated as occupying a gaseous section 18 of the hydrogen pump 10. The methodology comprises pumping the liquid hydrogen 12 through the hydrogen pump 10 in a passive manner without the use of auxiliary pumps although such pumps may be included to improve the liquid hydrogen 12 flow rates. Step 150 of the methodology may comprise receiving the liquid hydrogen 12 in the pump housing 36 at the start of a cycle of operation by opening the inlet valve 30 in the supply line 26 connecting the supply tank 20 to the pump housing 36.

As shown in FIG. 1, the supply tank 20 may be located at an elevation that facilitates gravitational feed of the liquid hydrogen 12 from the supply tank 20 into the pump housing 36. However, the liquid hydrogen 12 may be provided to the pump housing 36 using a separate pumping mechanism such as a mechanical pump as an alternative or in addition to a gravitational feed arrangement. The liquid hydrogen 12 from the supply tank 20 may flow through the supply line 26 and may pass through and/or fill the intermediate section 28. As can be seen in FIG. 1, the inlet valve 30 may initially be provided in a closed condition in step 150. The inlet valve 30 may be regulated by an inlet valve actuator 32 illustrated in FIG. 1 and which may be communicatively coupled to the fill sensor 50 and/or depletion sensor 52 and/or to other components such as the flow control valve 60 and vent valve 70.

Figure 2:
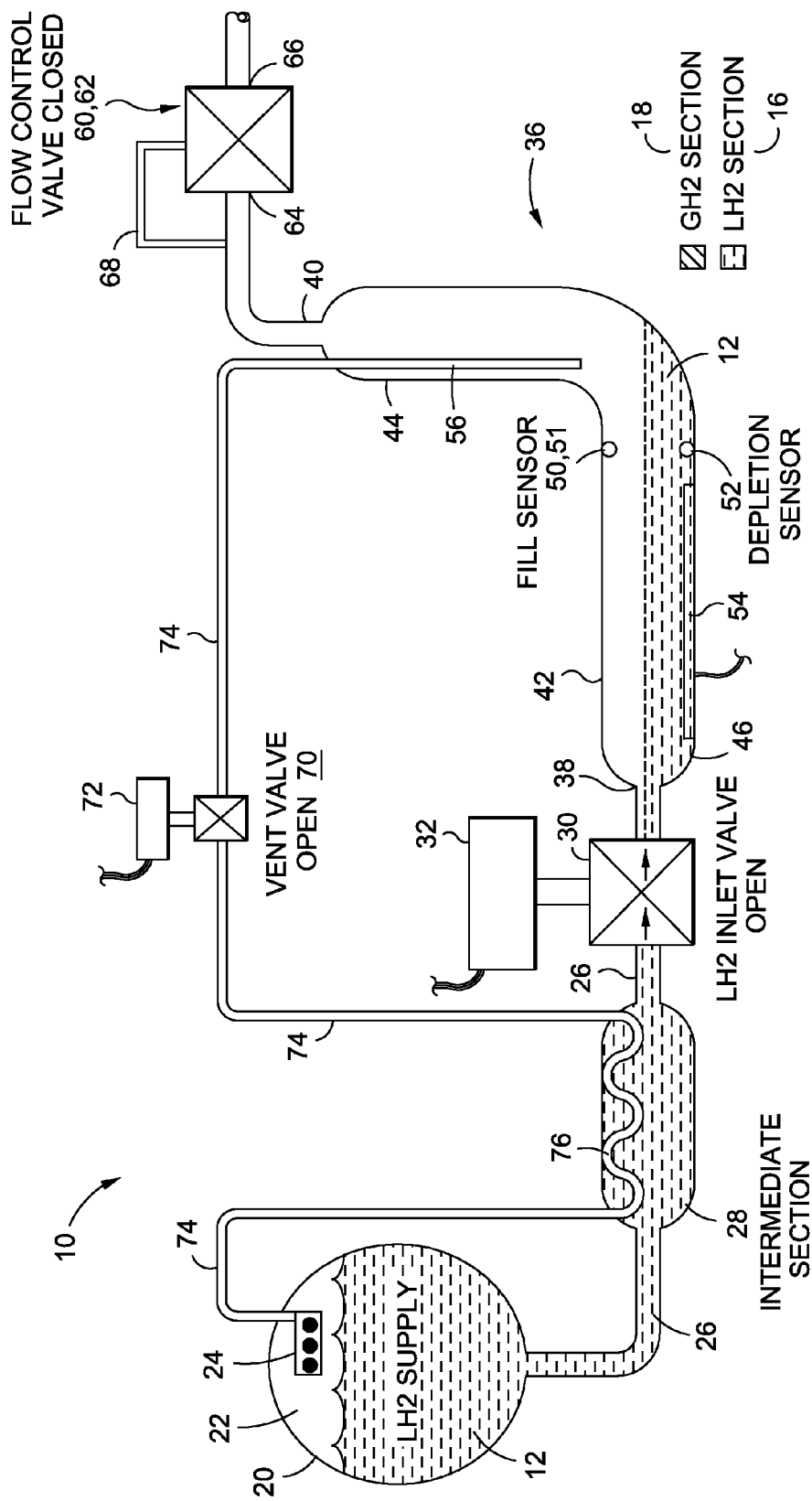
FIG. 2 is a schematic illustration of the hydrogen pump wherein the inlet valve is open to allow the pump housing to receive liquid hydrogen through a housing inlet.

Referring to FIG. 2, in step 152, the inlet valve actuator 32 may open the inlet valve 30 allowing liquid hydrogen 12 to flow from the supply tank 20 and into the intermediate section 28 such that the liquid hydrogen 12 is received within the pump housing 36. The inlet valve 30 may be maintained in the open position until the liquid hydrogen 12 reaches a predetermined level within the pump housing 36 such as the fill level 51 shown in FIG. 2. The fill level 51 may be sensed by the fill sensor 50 or by another suitable sensing mechanism.

Referring to FIG. 3, step 154 may comprise closing the inlet valve 30 upon the liquid hydrogen 12 reaching a predetermined level such as the fill level 51. The pump housing 36 is preferably sealed to substantially eliminate outlets in the pump housing 36. For example, the pump housing 36 may be sealed by maintaining the inlet valve 30, flow control valve 60 and vent valve 70 in the closed position. Step 156 may comprise applying heat to the liquid hydrogen 12 within the pump housing 36 using the heating mechanism 54 to increase the temperature of the liquid hydrogen 12 such that the liquid hydrogen 12 is vaporized and generates gaseous hydrogen 14. The sealing of the pump housing 36 may be performed prior to the vaporization of the liquid hydrogen 12 into gaseous hydrogen 14 to prevent the discharge or escape of gaseous hydrogen 14 from the pump housing 36. The heating of the liquid hydrogen 12 may comprise applying heat to an exterior of the horizontal section 42 and/or to the vertical section 44. In addition, heating of the liquid hydrogen 12 may comprise applying heat directly or indirectly to the liquid hydrogen 12 by any suitable means including, but not limited to, a heating element extending around an exterior of the pump housing 36 and/or by mounting one or more probes within the horizontal section 42 such that the probes extend into the liquid hydrogen 12.

As can be seen in FIG. 3, the pump housing 36 may contain the liquid hydrogen 12 in the horizontal section 42 and the gaseous hydrogen 14 in the vertical section 44 although the gaseous hydrogen 14 may also fill a portion of the horizontal section 42, and vice versa. In an embodiment, the pump housing 36 may form an L-shaped configuration which may facilitate uniform accumulation of gaseous hydrogen 14 within the vertical section 44 and which may also facilitate uniform flow of the pressurized gaseous hydrogen 14 out of the vertical section 44 through the housing outlet 40 and/or the flow control valve 60. The horizontal orientation of the horizontal section 42 may facilitate settling of the liquid hydrogen 12 as the liquid hydrogen 12 enters the pump housing 36. In this regard, the horizontal section 42 may include one or more housing inlets 38 and is not limited to the specific configuration shown containing a single housing inlet 38.

Referring still to FIG. 3, step 158 may comprise opening the flow control valve 60 upon attainment of a predetermined pressure of the gaseous hydrogen 14 within the pump housing 36. Upon opening of the flow control valve 60, the gaseous hydrogen 14 may be released from the pump housing 36 for delivery to a downstream component. The gaseous hydrogen 14 may be continuously generated due to heating thereof by the heating mechanism 54. In this regard, generation of the gaseous hydrogen 14 at the predetermined pressure level may continue with the flow control valve 60 being maintained in the open position in correspondence with maintaining a predetermined pressure of the gaseous hydrogen 14.

The heating of the liquid hydrogen 12 may be continuous, intermittent and/or on an as-needed basis for generating the gaseous hydrogen 14. In addition, heat may be applied to the liquid hydrogen 12 and/or to the gaseous hydrogen 14 depending upon the requirements of the downstream system to which the gaseous hydrogen 14 may be delivered. In an embodiment, the heating may continue until the liquid hydrogen 12 within the pump housing 36 falls below a predetermined level as may be sensed by the depletion sensor 52 shown in FIGS. 1-6.

Referring to FIG. 4, upon the liquid hydrogen 12 falling below the depletion level 53, step 160 comprises closing the flow control valve 60. The pump housing 36 may contain residual gaseous hydrogen 34 in the horizontal section 42 and/or vertical section 44. Step 162 may comprise opening the inlet valve 30 wherein the relatively higher pressure in the pump housing 36 results in the residual gaseous hydrogen 34 or gaseous hydrogen 14 flowing back through the housing inlet 38 and into the supply line 26 and/or intermediate section 28. Upon flowing back through the housing inlet 38, the gaseous hydrogen 14 encounters the liquid hydrogen 12 and may mix with the liquid hydrogen 12 in step 164. Such mixing may reduce the temperature of the gaseous hydrogen 14 to a temperature generally equal to that of the liquid hydrogen 12.

Referring to FIG. 5, step 166 comprises opening the vent valve 70 to vent residual gaseous hydrogen 34 remaining in the pump housing 36 to reduce the pressure therewithin. The vent line 74 may connect the pump housing 36 to the supply tank 20 such that the residual gaseous hydrogen 34 flows through the vent line 74 and is discharged into the supply tank 20 when the vent valve 70 is opened. In step 168, heat may be extracted from the gaseous hydrogen 14 in the vent line 74 by routing a portion of the vent line 74 through the intermediate section 28. However, heat may be extracted from the residual gaseous hydrogen 34 using alternative arrangements. For example, the vent line 74 may be routed through any section of the hydrogen pump 10 containing liquid hydrogen 12 in order to extract heat contained within the residual gaseous hydrogen 34 prior to discharge thereof into the supply tank 20.

Referring still to FIG. 5, the method may further comprise the step of removing liquid droplets which may be entrained in the residual gaseous hydrogen 34 in the pump housing 36 prior to the gaseous hydrogen 14 entering the vent line 74. In this regard, the coalescing filter 56 as described above may be employed in order to prevent the entrance of liquid droplets into the vent line 74 which may otherwise clog the vent line 74. As can be seen in FIG. 5, the inlet valve 30 may be opened when the vent valve 70 is opened such that additional liquid hydrogen 12 may flow into the pump housing 36 while simultaneously venting the gaseous hydrogen 14 to the supply tank 20.

Figure 6:
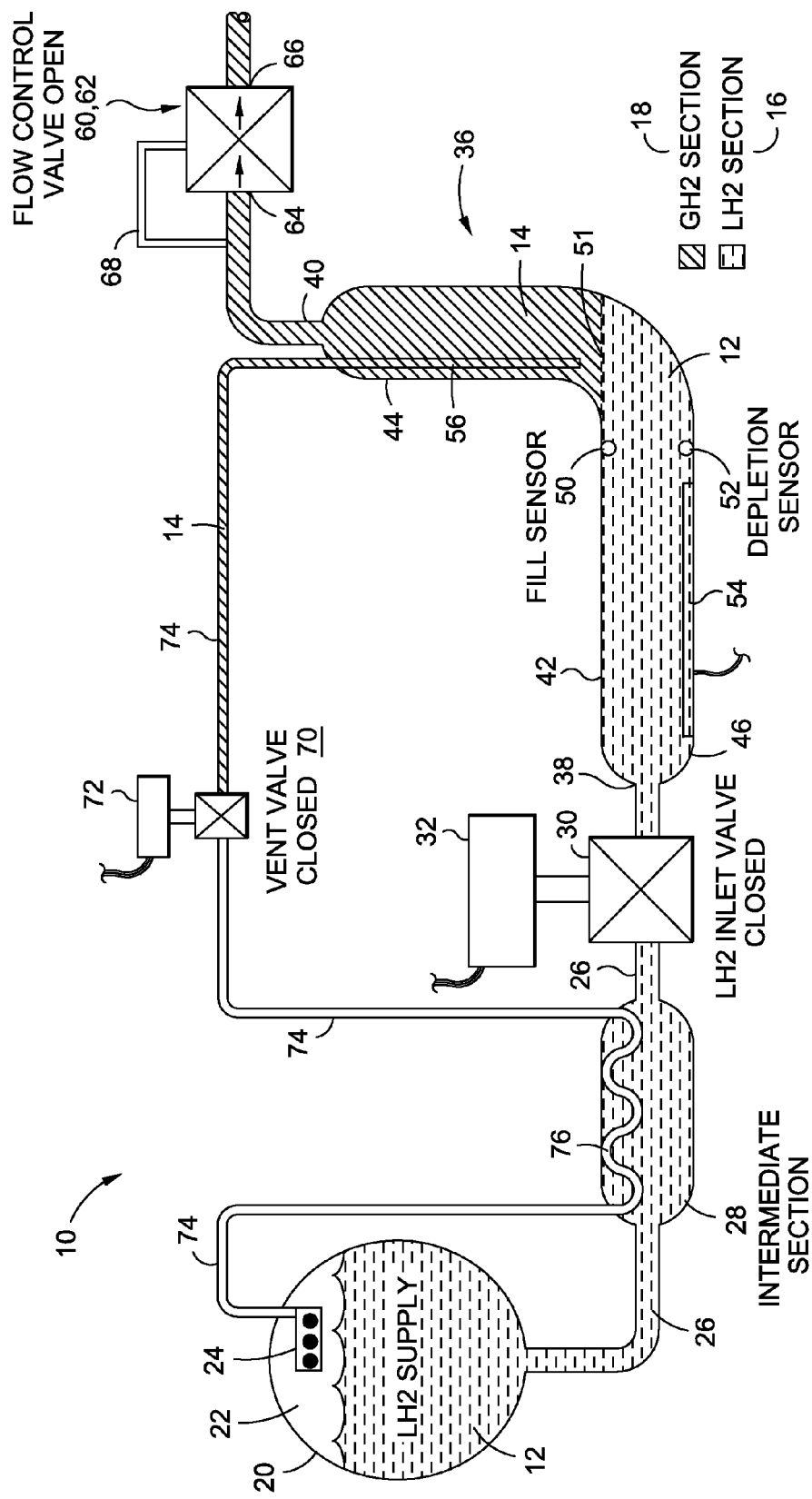
FIG. 6 is a schematic illustration of the hydrogen pump wherein the pump housing is filled with liquid hydrogen and the inlet valve and vent valve are closed to facilitate vaporization of the liquid hydrogen into gaseous hydrogen at the start of another cycle.
Figure 7:
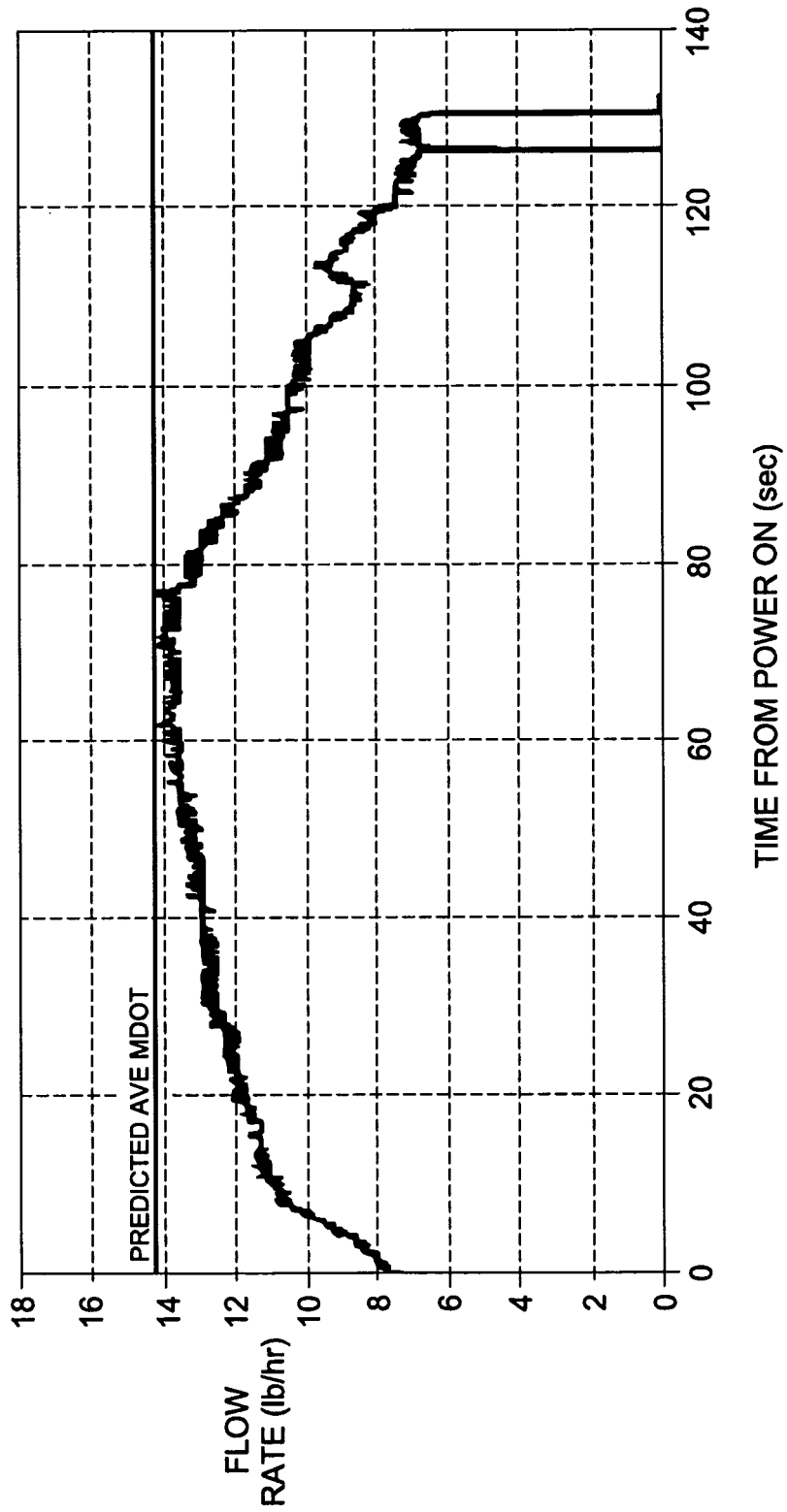
FIG. 7 is a methodology of generating gaseous hydrogen from liquid hydrogen.

Referring to FIG. 6, step 170 may comprise filling the pump housing 36 with liquid hydrogen 12 at the start of a new cycle. The liquid hydrogen 12 may flow into the housing inlet 38 and displace the residual gaseous hydrogen 34 or gaseous hydrogen 14, forcing the gaseous hydrogen 14 to be vented from the pump housing 36 through the vent line 74. The liquid hydrogen 12 may flow into the pump housing 36 when the inlet valve 30 is in the open position. The inlet valve 30 may remain open until the level of the liquid hydrogen 12 within the pump housing 36 reaches the predetermined level such as the fill level 51 indicated by the fill sensor 50. The pump housing 36 may be sealed by closing the inlet valve 30, vent valve 70 and flow control valve 60 while the heating mechanism 54 applies heat to the liquid hydrogen 12. The above described steps may be repeated continuously until the liquid hydrogen 12 within the supply tank 20 is depleted or the operation may be terminated at an earlier time.

Figure 8:
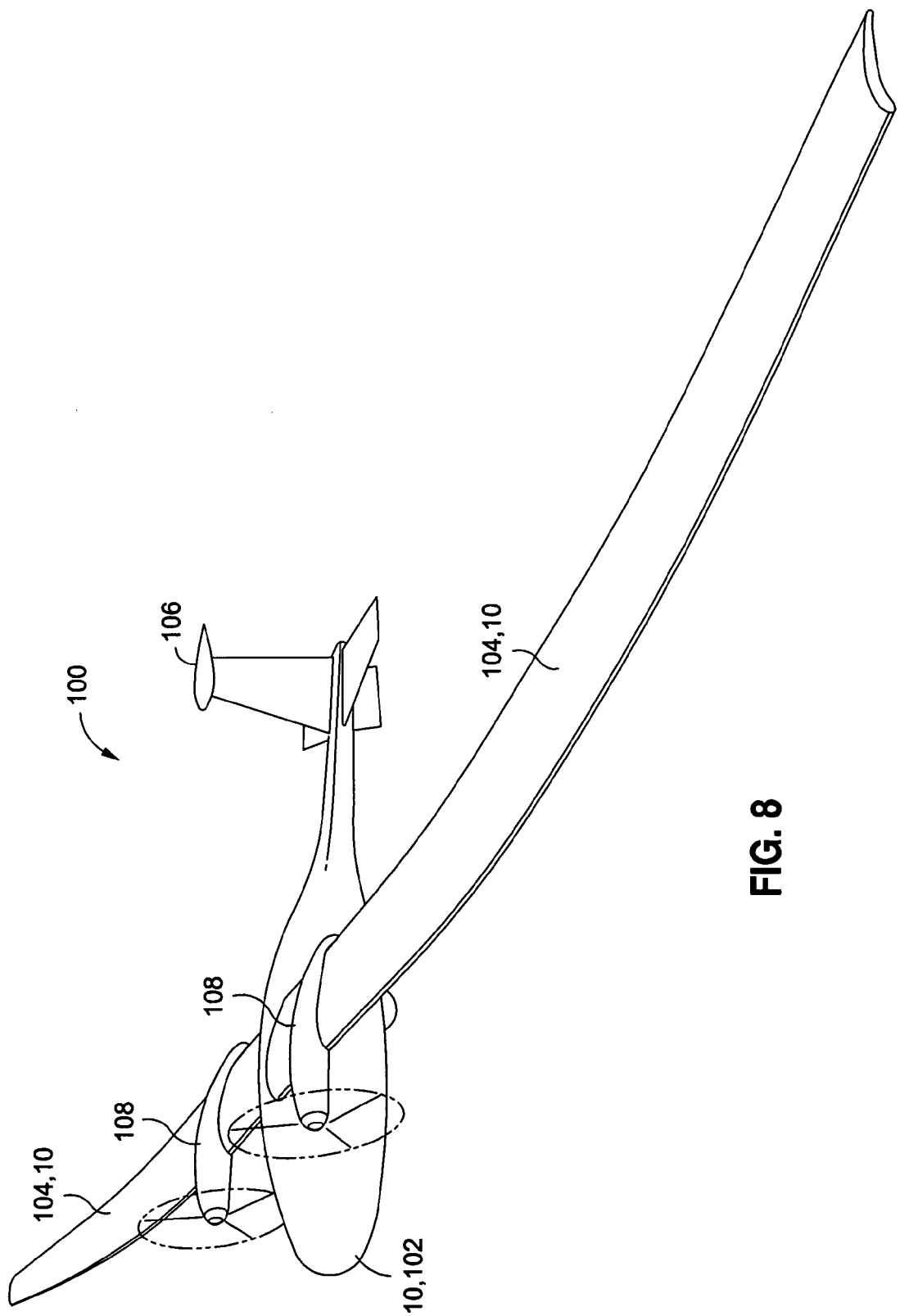
FIG. 8 is plot of hydrogen flow rate over time for an embodiment of the hydrogen pump.

Referring to FIG. 8, shown is a plot of flow rate of gaseous hydrogen 14 versus time as measured during testing of an embodiment of the hydrogen pump 10. The plot includes a horizontal line illustrating a predicted flow rate (i.e., predicted ave. mdot) of gaseous hydrogen 14. An embodiment of the hydrogen pump 10 as tested resulted in a mass flow rate of approximately 8-14 pounds of hydrogen per hour during an operating time of approximately 120 seconds. The initial increase in flow rate as illustrated in the curve on a left-hand side of the plot is associated with thermal stratification of the liquid hydrogen 12 at startup. The curve represents the vaporization of the liquid hydrogen 12 by boiling away the liquid hydrogen 12 within the pump housing 36. The decrease in the flow rate illustrated in the curve on a right-hand side of the plot may be associated with a reduction in the surface area of the liquid hydrogen 12 in the pump housing 36 during boil off due to the reducing surface area of the liquid hydrogen within the cylindrically shaped pump housing 36.

Figure 9:
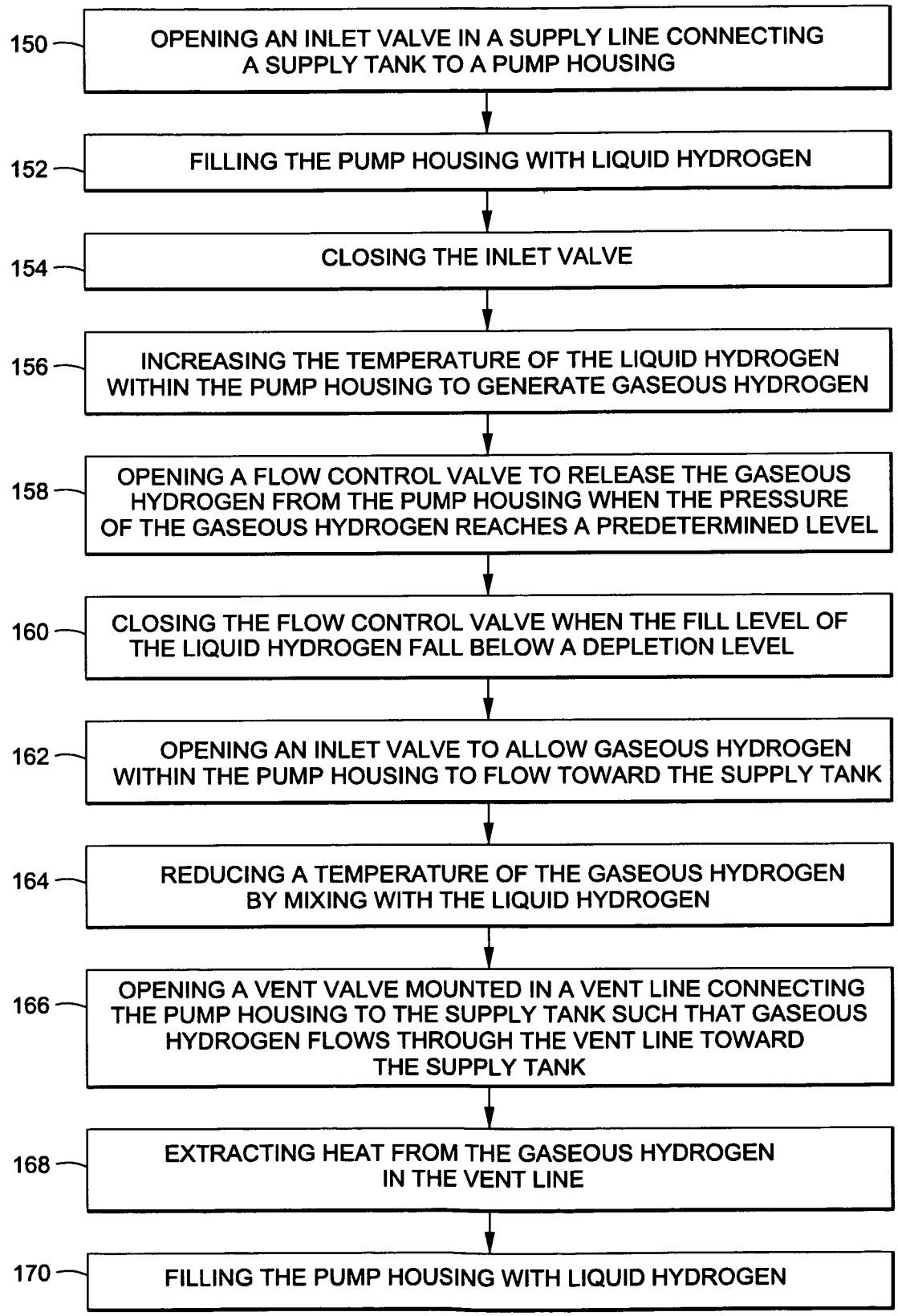
FIG. 9 is a perspective illustration of an aircraft in an embodiment of a vehicle that may include the hydrogen pump.

Referring to FIG. 9, shown is an aircraft 100 such as a high-altitude, long-endurance (i.e., HALE) aircraft 100 into which the hydrogen pump 10 may be incorporated. As can be seen, the aircraft 100 may include a conventional arrangement having a fuselage 102 with wings 104 and a tail section 106. The aircraft 100 may include one or more propulsion units 108 which may be provided in a variety of configurations including, but not limited to, an internal combustion engine in either a turbine arrangement and/or a piston arrangement for combusting the gaseous hydrogen 14 generated by the hydrogen pump 10.

Although the hydrogen pump 10 is illustrated and described in an embodiment which may be integrated into the aircraft 100 illustrated in FIG. 9, it should be noted that the hydrogen pump 10 and methodology may be integrated into any system, subsystem, assembly, subassembly, structure and vehicle including marine, land, air and/or space vehicles. In addition, the hydrogen pump 10 may be incorporated into any application and may be used in any industry, operation or process as indicated above. Advantageously, the hydrogen pump 10 and methodology provides a passive, closed system for vaporizing and pumping hydrogen in a reliable and efficient manner for use by any downstream component.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A hydrogen pump, comprising:
a supply tank storing liquid hydrogen;
a pump housing receiving the liquid hydrogen from the supply tank through a housing inlet;
a heating mechanism comprising at least one of a heating element on an exterior of the pump housing and a probe extending into the liquid hydrogen the heating mechanism vaporizing at least a portion of the liquid hydrogen into gaseous hydrogen and increasing a pressure thereof within the pump housing, the pump housing releasing the gaseous hydrogen through a housing outlet upon attainment of a predetermined pressure of the gaseous hydrogen in the pump housing;
the pump housing closing the housing outlet and venting residual gaseous hydrogen from the pump housing to allow additional liquid hydrogen to enter the pump housing through the housing inlet;
a vent line extending between the pump housing and the supply tank; and
a vent valve mounted in the vent line and venting residual gaseous hydrogen from the pump housing to the supply tank to reduce a pressure within the pump housing such that liquid hydrogen flows from the supply tank and into the pump housing;
an intermediate section fluidly connecting the supply tank to the housing inlet and containing liquid hydrogen; and
a heat extraction mechanism comprising a portion of the vent line extending through the liquid hydrogen in the intermediate section and extracting heat from the gaseous hydrogen in the vent line.

2. The hydrogen pump of claim 1 further comprising:
an inlet valve coupled to the housing inlet and being operative to open such that the liquid hydrogen is received in the pump housing, the inlet valve being operative to close in response to the liquid hydrogen reaching a fill level in the pump housing.

3. The hydrogen pump of claim 2 wherein:
the inlet valve is operative to open in response to the liquid hydrogen falling below a depletion level.

4. A passive hydrogen pump, comprising:
a supply tank storing liquid hydrogen;
a pump housing connected to the supply tank and receiving the liquid hydrogen from the supply tank;
an inlet valve interposed between the supply tank and the pump housing;
a heating mechanism comprising at least one of a heating element on an exterior of the pump housing and a probe extending into the liquid hydrogen the heating mechanism vaporizing at least a portion of the liquid hydrogen into gaseous hydrogen within the pump housing and increasing a pressure thereof within the pump housing;
a flow control valve releasing the gaseous hydrogen from the pump housing
upon attainment of a predetermined pressure within the pump housing, the flow control valve closing when the liquid hydrogen in the pump housing falls below a depletion level;
a vent line extending between the pump housing and the supply tank; and a vent valve mounted in the vent line and venting residual gaseous hydrogen from the pump housing to the supply tank to reduce a pressure within the pump housing such that liquid hydrogen flows from the supply tank and into the pump housing;
an intermediate section fluidly connecting the supply tank to a pump housing inlet and containing liquid hydrogen; and
a heat extraction mechanism comprising a portion of the vent line extending through the liquid hydrogen in the intermediate section and extracting heat from the gaseous hydrogen in the vent line.

5. The hydrogen pump of claim 4 further comprising:
at least one of a fill sensor and a depletion sensor coupled to the pump housing and being configured to sense a fill level of the liquid hydrogen in the pump housing.

6. The hydrogen pump of claim 4 wherein:
when the pressure of the gaseous hydrogen in the pump housing is higher than the pressure of the liquid hydrogen in the intermediate section, the pump housing is configured to open a housing inlet when the liquid hydrogen in the pump housing falls below a depletion level such that gaseous hydrogen in the pump housing flows into the intermediate section and mixes with the liquid hydrogen due to the higher pressure of the gaseous hydrogen in the pump housing relative to the pressure of the liquid hydrogen in the intermediate section.

7. The hydrogen pump of claim 4 further comprising:
a diffuser configured to reduce a velocity of gaseous hydrogen discharging from the vent line into the supply tank.

8. The hydrogen pump of claim 4 wherein:
the pump housing includes a horizontal section and a vertical section;
the horizontal section configured for containing the liquid hydrogen; and
the vertical section configured for accumulating the gaseous hydrogen.

9. A method of pumping hydrogen, comprising the steps of:
receiving liquid hydrogen in a pump housing from a supply tank;
vaporizing at least a portion of the liquid hydrogen into gaseous hydrogen in the pump housing without the use of a mechanical pump;
releasing the gaseous hydrogen from the pump housing upon attainment of a predetermined pressure; and
venting residual gaseous hydrogen from the pump housing back to the supply tank such that additional liquid hydrogen flows into the pump housing, wherein the venting of residual gaseous hydrogen from the pump housing comprises a step of extracting heat from the residual gaseous hydrogen in a vent line extending through liquid hydrogen contained in an intermediate section located between the supply tank and the pump housing.

10. The method of claim 9 further comprising the step of:
sealing the pump housing prior to vaporizing the liquid hydrogen.

11. The method of claim 9 further comprising the step of:
heating the liquid hydrogen within the pump housing to increase a pressure of the gaseous hydrogen therewithin.

12. The method of claim 9 wherein the liquid hydrogen is received from the supply tank, the step of venting the residual gaseous hydrogen in the pump housing comprising:
venting the residual gaseous hydrogen to the supply tank to reduce the pressure within the pump housing such that the additional liquid hydrogen flows into the pump housing.

13. The method of claim 12 wherein the step of:
extracting heat from the residual gaseous hydrogen occurs prior to venting the residual gaseous hydrogen to the supply tank.

14. The method of claim 9 wherein the step of venting the residual gaseous hydrogen comprises removing liquid hydrogen droplets entrained in the gaseous hydrogen prior to venting the residual gaseous hydrogen from the pump housing.

15. The method of claim 9 further comprising the step of:
increasing a pressure of the gaseous hydrogen in the pump housing higher than the pressure of the liquid hydrogen in the intermediate section; and
opening a housing inlet when the liquid hydrogen in the pump housing falls below a depletion level such that the gaseous hydrogen in the pump housing flows into the intermediate section and mixes with the liquid hydrogen in the intermediate section due to the higher pressure of the gaseous hydrogen in the pump housing relative to the pressure of the liquid hydrogen in the intermediate section.

16. A passive method of generating gaseous hydrogen from liquid hydrogen, comprising the steps of:
receiving liquid hydrogen in a pump housing from a supply tank through a housing inlet of the pump housing thereof;
closing the housing inlet;
vaporizing at least a portion of the liquid hydrogen into gaseous hydrogen without the use of a mechanical pump;
opening a housing outlet to release the gaseous hydrogen upon attainment of a predetermined pressure within the pump housing;
closing the housing outlet;
opening the housing inlet; and
venting residual gaseous hydrogen from the pump back to the supply tank housing such that additional liquid hydrogen flows into the pump housing, wherein the venting of residual gaseous hydrogen from the pump housing comprises a step of extracting heat from the residual gaseous hydrogen in a vent line extending through liquid hydrogen contained in an intermediate section located between the supply tank and the pump housing.

17. The method of claim 16 wherein the liquid hydrogen is received from the supply tank, the step of venting residual gaseous hydrogen from the pump housing comprising:
venting the residual gaseous hydrogen to the supply tank.

18. The method of claim 17 further comprising the step of:
extracting heat from the residual gaseous hydrogen prior to venting the residual gaseous hydrogen to the supply tank.

19. The method of claim 16 further comprising the step of:
increasing a pressure of the gaseous hydrogen in the pump housing higher than the pressure of the liquid hydrogen in the intermediate section; and
opening the housing inlet when the liquid hydrogen in the pump housing falls below a depletion level such that the gaseous hydrogen in the pump housing flows into the intermediate section and mixes with the liquid hydrogen in the intermediate section due to the higher pressure of the gaseous hydrogen in the pump housing relative to the pressure of the liquid hydrogen in the intermediate section.

\* \* \* \* \*